United States Patent
Zhang et al.

(10) Patent No.: US 11,177,732 B1
(45) Date of Patent: Nov. 16, 2021

(54) DYNAMIC RESONANCE CONTROL FOR GRID-TIED POWER CONVERTERS

(71) Applicant: Rockwell Automation Technologies, Inc., Mayfield Heights, OH (US)

(72) Inventors: Zhendong Zhang, Mequon, WI (US); Rob Miklosovic, Chardon, OH (US); Ahmed Mohamed Sayed Ahmed, Mequon, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 17/013,175

(22) Filed: Sep. 4, 2020

(51) Int. Cl.
*H02M 1/12* (2006.01)
*H02M 7/5387* (2007.01)
*H02M 1/00* (2006.01)

(52) U.S. Cl.
CPC ....... *H02M 1/126* (2013.01); *H02M 7/53871* (2013.01); *H02M 1/0009* (2021.05)

(58) Field of Classification Search
CPC ...... H02M 1/12; H02M 1/126; H02M 7/5387; H02M 7/53871; H02M 7/0009; H02M 1/0003
See application file for complete search history.

(56) References Cited

U.S. PATENT DOCUMENTS

| | | | |
|---|---|---|---|
| 7,450,405 B2 | 11/2008 | Ponnaluri et al. | |
| 7,518,893 B2 | 4/2009 | Ponnaluri et al. | |
| 8,553,434 B2 | 10/2013 | Coccia et al. | |
| 9,973,103 B1 | 5/2018 | Vadhavkar et al. | |
| 2017/0005473 A1* | 1/2017 | Somani | H02J 3/381 |
| 2018/0138849 A1* | 5/2018 | Royak | H02P 23/14 |
| 2019/0123662 A1* | 4/2019 | Zhang | H02J 3/381 |

(Continued)

OTHER PUBLICATIONS

Leonardo Augusto Serpa, et al. "A Modified Direct Power Control Strategy Allowing the Connection of Three-Phase Inverters to the Grid Through LCL Filters", IEEE Transactions on Industry Applications, vol. 43, No. 5, dated Sep./Oct. 2007, pp. 1388-1400.

(Continued)

*Primary Examiner* — Adolf D Berhane
(74) *Attorney, Agent, or Firm* — Kunzler Bean & Adamson; Bruce R. Needham

(57) ABSTRACT

A component includes an adaptive estimator. A converter includes a switching rectifier connected to an LCL filter with a converter inductor, a capacitor, and grid inductor connected to a voltage source through a conductor with unknown inductance. Current of the converter inductor is input to the adaptive estimator which includes an ideal LCL filter model that generates, using a simple filter, a desired dynamic behavior of the converter and LCL filter and a disturbance compensator. An LCL steady-state ("SS") compensation models a steady-state effect of the LCL filter and conductor. Output of the adaptive estimator is subtracted from output of the LCL SS compensation to form a disturbance estimate, which is summed with a feedback loop output of the converter to form a voltage control signal that controls switching of the switching rectifier. The voltage control signal is summed with the disturbance estimate and is input to the adaptive estimator.

20 Claims, 8 Drawing Sheets

(56) References Cited

U.S. PATENT DOCUMENTS

2020/0280267 A1* 9/2020 Restrepo ................ H02M 1/44
2021/0249862 A1* 8/2021 Awal ........................ H02J 3/24

OTHER PUBLICATIONS

Vladimir Blasko, et al., "A Novel Control to Actively Damp Resonance in Input LV Filter of a Three-Phase Voltage Source Converter", IEEE Transactions on Industry Applications, vol. 33, No. 2, dated Mar./Apr. 1997, pp. 542-550.

Joerg Dannehl, et al., "Investigation of Active Damping Approaches for PI-Based Current Control of Grid-Connected Pulse Width Modulation Converters With LCL Filters", IEEE Transactions on Industry Applications, vol. 46, No. 4, dated Jul./Aug. 2010, pp. 1509-1517.

Joerg Dannehl, et al., "PWM Rectifier with LCL-Filter using different Current Control Structures", Deutsche Forschungsgmeinschaft and Danfoss Drives, 2007, pp. 1-10.

Joerg Dannehl, et al., "Limitations of Voltage-Oriented PI Current Control of Grid-Connected PWM Rectifiers With LCL Filters", IEEE Transactions on Industry Applications, vol. 56, No. 2, dated Feb. 2009, pp. 380-388.

Jorge Gabe, et al., "Stability Analysis of Grid-Connected Voltage Source Inverters with LCL-Filters using Partial State Feedback", CNPq, pp. 1-10.

Wenqiang Zhao, et al., "Comparison of Active and Passive Damping Methods for Application in High Power Active Power Filter with LCL-filter", Lixiang Wei, IEEE Xplore, downloaded Jan. 7, 2010, pp. 1-6.

Ricchiuto, et al., "Robustness Analysis of Active Damping Methods for an Inverter connected to the grid with an LCL-Filter", Milwaukee School of Engineering, IEEE Xplore, downloaded Jul. 23, 2020, pp. 2028-2035.

Vlatko Miskovic, et al., "Observer-Based Active Damping of LCL Resonance in Grid-Connected Voltage Source Converters", IEEE Transactions on Industry Applications, vol. 50, No. 6, dated Nov./Dec. 2014, pp. 3977-3985.

Mehmet Buyuk, et al., "A Notch Filter based Active Damping of LLCL Filter in Shunt Active Power Filter", 19th International Symposium Power Electronics, Oct. 19-21, 2017, pp. 1-5.

Liserre, et al., "An overview of three-phase voltage source active rectifiers interfacing the utility", IEEE Bologna PowerTech Conference, Jun. 23-26, 2003, pp. 1-8.

Yun Wei Li, et al., "Damping of PWM Currenct-Source Rectifier Using a Hybrid Combination Approach", IEEE Transactions on Industry Applications, vol. 22, No. 4, dated Jul. 2007, pp. 1383-1392.

Ahmed, et al., "Passive Filter Design for Three-Phase Inverter Interfacing in Distributed Generation", IEEE Xplore, downloaded Apr. 18, 2010, pp. 1-9.

Christian Wessels, et al., "Active Damping of LCL-Filter Resonance based on Virtual Resistor for PWM Rectifiers—Stability Analysis with Different Filter Parameters", Institute of Power Electronics and Electrical Drives, pp. 1-7.

Wenqiang Zhao, et al., "Comparison and Passive Damping Methods for Application in High Power Active Power Filter with LCL-filter", Lixiang Wei, IEEE Xplore, downloaded Jan. 7, 2010, pp. 1-6.

Michael H. Bierhoff, et al. "Active Damping for Three-Phase PWM Rectifiers With High-Order Line-Side Filters", IEEE Transactions on Industry Applications, vol. 56, No. 2, dated Feb. 2009, pp. 371-379.

Erika Twining, et al., "Grid Current Regulation of a Three-Phase Voltage Source Inverter With an LCL Input Filter", IEEE Transactions on Power Electronics vol. 18, No. 3, May 2003, pp. 888-895.

Yang, et al., "Study on Active Damping Methods for Voltage Source Converter with LCL Input Filter", Lixiang Wei, IEEE Xplore, downloaded Jan. 7, 2010, pp. 975-979.

Toshihiko Tanaka, et al., "A New Method of Damping Harmonic Resonance at the DC-Link of a Large Capacity Rectifier-Inverter System", Milwaukee School of Engineering, IEEE Xplore, downloaded Jul. 23, 2020, pp. 888-893.

Usluer, et al., "Series Active Filter Based Resonance Damping of High Power Three-phase, LCL Filtered, Grid Connected Voltage Source Inverters", Milwaukee School of Engineering, IEEE Xplore, downloaded Jul. 23, 2020, pp. 643-648.

* cited by examiner

DYNAMIC RESONANCE CONTROL FOR GRID-TIED POWER CONVERTERS

BACKGROUND INFORMATION

The subject matter disclosed herein relates to power converters and more specifically to dynamic resonance control of grid-tied power converters. The power converters' power flow may be unidirectional or bidirectional.

BRIEF DESCRIPTION

A component for dynamic resonance control of a grid-tied power converter is disclosed. A method and computer program product also perform the functions of the component. The component includes an adaptive estimator for a converter. The adaptive estimator includes a voltage input and a current input. The converter includes a switching rectifier connected to an inductor-capacitor-inductor ("LCL") filter including, for each phase of the converter, a converter inductor connected to the switching rectifier, a capacitor, and a grid inductor connected to a voltage source through a source conductor with an unknown inductance. The current input is from at least one converter inductor of a phase of the converter. The adaptive estimator includes an ideal LCL filter model and a disturbance compensator. The ideal LCL filter model is configured to generate, using a simple filter, a desired dynamic behavior of the converter and LCL filter. The component includes an LCL steady-state ("SS") compensation configured to model a steady-state effect of the LCL filter and source conductor. An output of the adaptive estimator is subtracted from an output of a feedback loop of the converter to form a preliminary voltage control signal. The preliminary voltage control signal is summed with an output of the LCL SS compensation to form a voltage control signal configured to control switching of the switching rectifier. The preliminary voltage control signal is the voltage input to the adaptive estimator.

A method for dynamic resonance control of a grid-tied power converter includes subtracting an output of an adaptive estimator from an output of a feedback loop of a converter to form a preliminary voltage control signal. The converter includes a switching rectifier and an LCL filter that includes, for each phase of the converter, a converter inductor connected to the switching rectifier, a capacitor, and a grid inductor connected to a voltage source through a source conductor with an unknown inductance. The adaptive estimator includes an ideal LCL filter model and a disturbance compensator. The ideal LCL filter model generates, using a simple filter, a desired dynamic behavior of the converter and LCL filter. The method includes inputting output current of the converter to the adaptive estimator. The output current of the converter is based on current of at least one converter inductor. The method includes summing the preliminary voltage control signal with output of an LCL SS compensation to form a voltage control signal. The voltage control signal controls switching of the switching rectifier. The LCL SS compensation models a steady-state effect of the LCL filter and source conductor. The preliminary voltage control signal is a voltage input to the adaptive estimator.

A system includes a converter and a controller for the converter. The converter includes a switching rectifier and an LCL filter that includes, for each phase of the converter, a converter inductor connected to the switching rectifier, a capacitor, and a grid inductor connected to a voltage source through a source conductor with an unknown inductance. The controller includes an adaptive estimator with a voltage input and a current input. The current input is from at least one converter inductor of a phase of the converter. The adaptive estimator includes an ideal LCL filter model and a disturbance compensator. The ideal LCL filter model is configured to generate, using a simple filter, a desired dynamic behavior of the converter and LCL filter. An LCL SS compensation is configured to model a steady-state effect of the LCL filter and source conductor. An output of the adaptive estimator is subtracted from an output of a feedback loop of the converter to form a preliminary voltage control signal. The preliminary voltage control signal is summed with an output of the LCL SS compensation to form a voltage control signal configured to control switching of the switching rectifier. The preliminary voltage control signal is the voltage input to the adaptive estimator.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore considered to be limiting of scope, the embodiments will be described and explained with additional specificity and detail through the use of the accompanying drawings, in which.

DETAILED DESCRIPTION

Figure 1:
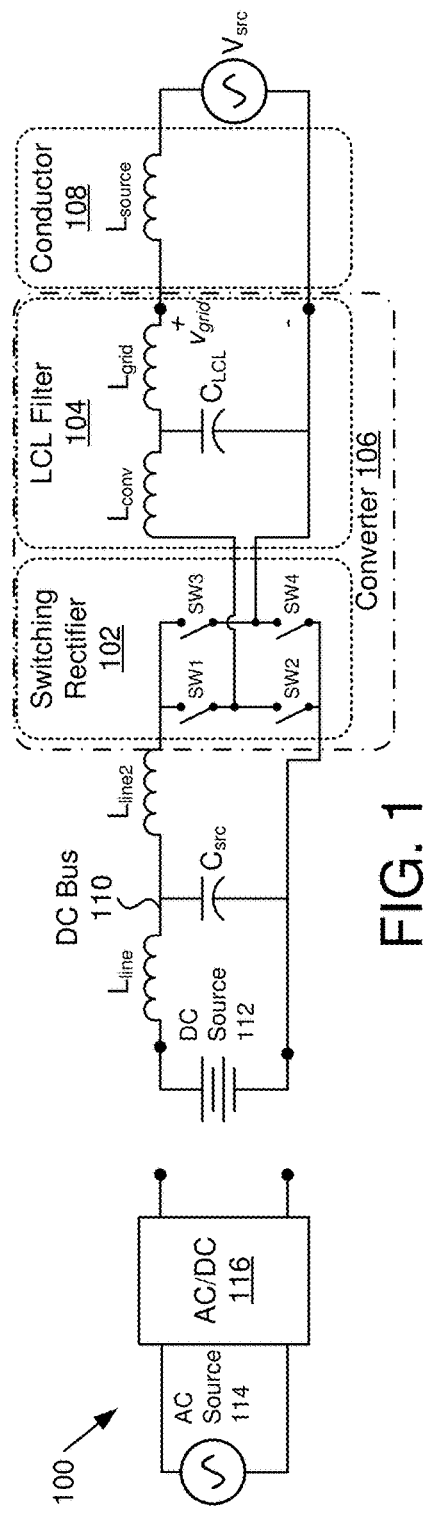
FIG. 1 is a schematic block diagram of a system for dynamic resonance control for a single-phase grid-tied power converter according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "estimator," "compensation," "controller," "system," etc. Furthermore, aspects of the present invention may take the form of a computer program product embodied in one or more computer readable medium(s) having program code embodied thereon.

Many of the functional units described in this specification have been labeled as an estimator, compensation, controller, or the like, in order to more particularly emphasize their implementation independence. For example, estimator, compensation, controller, etc. may be implemented a hardware circuit comprising custom VLSI circuits or gate arrays, off-the-shelf semiconductors such as logic chips, transistors, or other discrete components. An estimator, compensation, controller, etc. may also be implemented in programmable hardware devices such as field programmable gate arrays, programmable array logic, programmable logic devices or the like.

An estimator, compensation, controller, etc. may also be implemented in software for execution by various types of processors. An identified estimator, compensation, controller, etc. of program code may, for instance, comprise one or more physical or logical blocks of computer instructions which may, for instance, be organized as an object, procedure, or function. Nevertheless, the executables of an identified estimator, compensation, controller, etc. need not be physically located together but may comprise disparate instructions stored in different locations which, when joined logically together, comprise the estimator, compensation, controller, etc. and achieve the stated purpose for the module.

Indeed, an estimator, compensation, controller, or the like of program code may be a single instruction, or many instructions, and may even be distributed over several different code segments, among different programs, and across several memory devices. Similarly, operational data may be identified and illustrated herein within estimators, compensation, controllers, etc. and may be embodied in any suitable form and organized within any suitable type of data structure. The operational data may be collected as a single data set or may be distributed over different locations including over different storage devices, and may exist, at least partially, merely as electronic signals on a system or network. Where an estimator, compensation, controller, etc. or portions thereof are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's controller for a converter, partly on the user's controller for a converter, as a stand-alone software package to be installed in a controller, etc.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

A component for dynamic resonance control of a grid-tied power converter is disclosed. A method and computer program product also perform the functions of the component. The component includes an adaptive estimator for a converter. The adaptive estimator includes a voltage input and a current input. The converter includes a switching rectifier connected to an inductor-capacitor-inductor ("LCL") filter including, for each phase of the converter, a converter inductor connected to the switching rectifier, a capacitor, and a grid inductor connected to a voltage source through a source conductor with an unknown inductance. The current input is from at least one converter inductor of a phase of the converter. The adaptive estimator includes an ideal LCL filter model and a disturbance compensator. The ideal LCL filter model is configured to generate, using a simple filter, a desired dynamic behavior of the converter and LCL filter. The component includes an LCL steady-state ("SS") compensation configured to model a steady-state effect of the LCL filter and source conductor. An output of the adaptive estimator is subtracted from an output of a feedback loop of the converter to form a preliminary voltage control signal. In some embodiments, the preliminary control signal compensates for any dynamic differences from the ideal model. The preliminary voltage control signal is summed with an output of the LCL SS compensation to form a voltage control signal configured to control switching of the switching rectifier. The preliminary voltage control signal is the voltage input to the adaptive estimator.

The output of the adaptive estimator, which is a disturbance estimate, includes any dynamic differences between an ideal model and the actual system, including unknown source inductances, nonlinearities, time variance, external disturbances, parameter perturbations, and slow degradation with age. When compensating for this disturbance in real time, the system is forced to behave with the desired dynamics of the ideal model.

In some embodiments, the LCL filter model is configured to generate the desired dynamic behavior of the converter and LCL filter with a model of an inductor that includes inductance of the converter inductor and the grid inductor without inductance of the source conductor. In other embodiments, the LCL filter model is further configured to generate the desired dynamic behavior of the converter and LCL filter with a model comprising effects of the switching rectifier. In other embodiments, the disturbance compensator includes at least proportional control. In other embodiments, an output of the ideal LCL filter model is subtracted from current in a converter inductor of at least one phase of the converter to form an input to the disturbance compensator. Output of the disturbance compensator is a disturbance estimate and the disturbance estimate is summed with the preliminary voltage control signal and a resultant signal is input to the ideal LCL filter model.

In some embodiments, compensation values of the disturbance compensator are related to compensation values of the feedback loop of the converter. In other embodiments, the component includes a scalar link that changes a proportional compensation value of the disturbance compensator by a scalar value of a proportional compensation value of the feedback loop of the converter and/or changes an integral compensation value of the disturbance compensator by a scalar value of an integral compensation value of the feedback loop of the converter. In other embodiments, compensation values of the feedback loop of the converter are derived based on the ideal LCL filter model. In other embodiments, output of the ideal LCL model is subtracted from a current reference signal to form an input to feedback compensation of the feedback loop of the converter. In other embodiments, an input to the switching rectifier is a direct current ("DC") source and the converter and LCL filter generate alternating current ("AC") current and voltage. In other embodiments, the switching rectifier is a full bridge rectifier with integrated circuit switches and the converter is bidirectional. In other embodiments, the converter is single phase, or three phase and each phase of the converter comprises an LCL filter where the converter is a three phase converter.

A method for dynamic resonance control of a grid-tied power converter includes subtracting an output of an adaptive estimator from an output of a feedback loop of a converter to form a preliminary voltage control signal. The converter includes a switching rectifier and an LCL filter that includes, for each phase of the converter, a converter inductor connected to the switching rectifier, a capacitor, and a grid inductor connected to a voltage source through a source conductor with an unknown inductance. The adaptive estimator includes an ideal LCL filter model and a disturbance compensator. The ideal LCL filter model generates, using a simple filter, a desired dynamic behavior of the converter and LCL filter. The method includes inputting output current of the converter to the adaptive estimator. The output current of the converter is based on current of at least one converter inductor. The method includes summing the preliminary voltage control signal with output of an LCL SS compensation to form a voltage control signal. The voltage control signal controlling switching of the switching rectifier. The LCL SS compensation models a steady-state effect of the LCL filter and source conductor. The preliminary voltage control signal is a voltage input to the adaptive estimator.

In some embodiments, the LCL filter model is configured to generate the desired dynamic behavior of the converter and LCL filter with a model of an inductor that includes inductance of the converter inductor and the grid inductor without inductance of the source conductor. In other embodiments, the LCL filter model is also configured to generate the desired dynamic behavior of the converter and LCL filter with a model comprising effects of the switching rectifier. In other embodiments, the method includes subtracting output of the ideal LCL model from a current reference signal and inputting a resultant signal to feedback compensation of the feedback loop of the converter. In other embodiments, the disturbance compensator includes at least proportional control. In other embodiments, the method includes subtracting an output of the ideal LCL filter model from current in a converter inductor of at least one phase of the converter to form an input to the disturbance compensator. An output of the disturbance compensator forms a disturbance estimate and the method includes summing the disturbance estimate with the preliminary voltage control signal and inputting a resultant signal to the ideal LCL filter model.

In some embodiments, the method includes setting a proportional compensation value of the disturbance compensator to be a scalar value of a proportional compensation value of the feedback loop of the converter and/or setting an integral compensation value of the disturbance compensator to be a scalar value of an integral compensation value of the feedback loop of the converter. In other embodiments, compensation values of the feedback loop of the converter are derived based on the ideal LCL filter model. In other embodiments, an input to the switching rectifier is a DC source and the converter and LCL filter generate AC current and voltage. The switching rectifier is a full bridge rectifier with integrated circuit switches and wherein the converter is bidirectional.

A system includes a converter and a controller for the converter. The converter includes a switching rectifier and an LCL filter that includes, for each phase of the converter, a converter inductor connected to the switching rectifier, a capacitor, and a grid inductor connected to a voltage source through a source conductor with an unknown inductance. The controller includes an adaptive estimator with a voltage input and a current input. The current input is from at least one converter inductor of a phase of the converter. The adaptive estimator includes an ideal LCL filter model and a disturbance compensator. The ideal LCL filter model is configured to generate, using a simple filter, a desired dynamic behavior of the converter and LCL filter. An LCL SS compensation is configured to model a steady-state effect of the LCL filter and source conductor. An output of the adaptive estimator is subtracted from an output of a feedback loop of the converter to form a preliminary voltage control signal. The preliminary voltage control signal is summed with an output of the LCL SS compensation to form a voltage control signal configured to control switching of the switching rectifier. The preliminary voltage control signal is the voltage input to the adaptive estimator.

Figure 2:
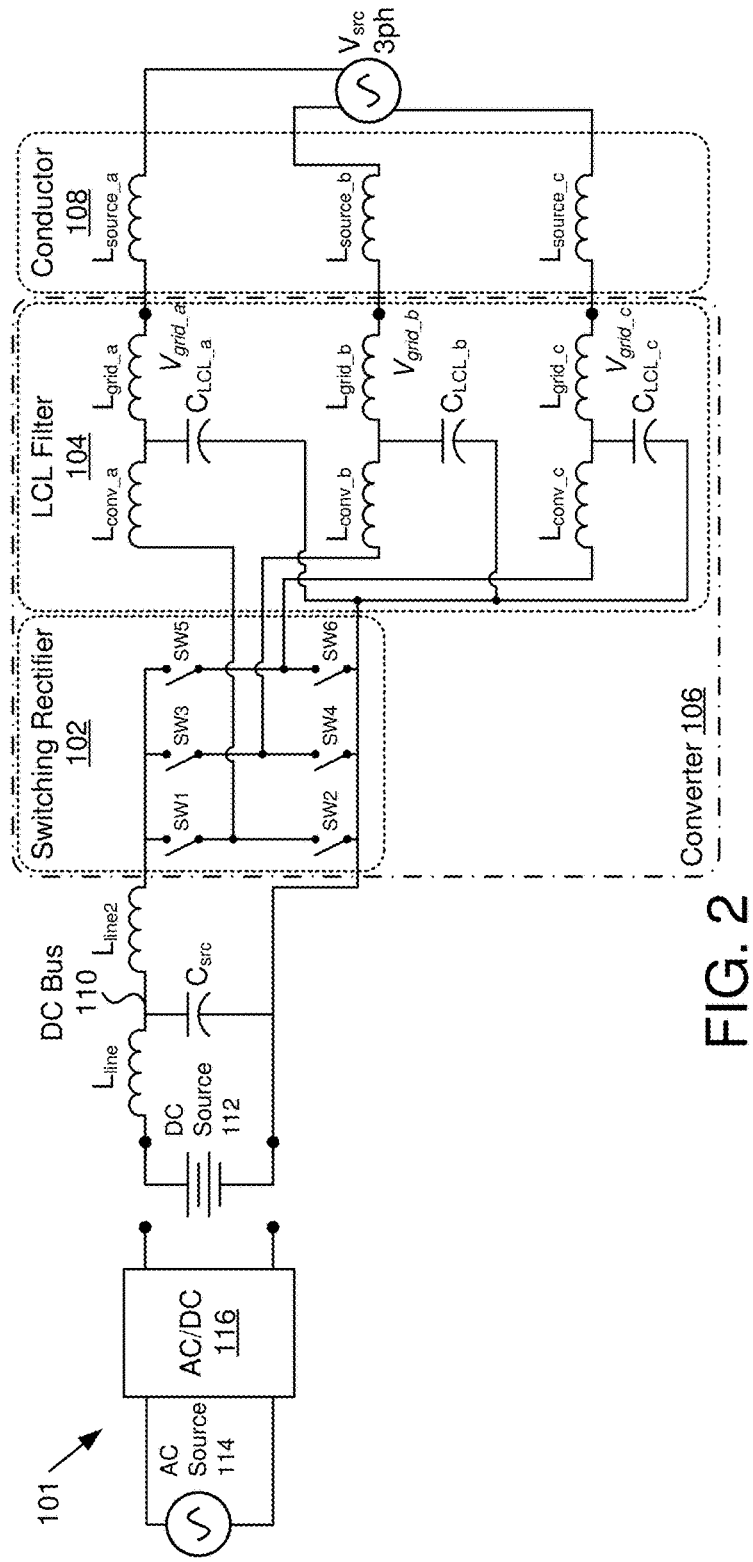
FIG. 2 is a schematic block diagram of a system for dynamic resonance control for a three-phase grid-tied power converter according to an embodiment.

FIG. 1 is a schematic block diagram of a system 100 for dynamic resonance control for a single-phase grid-tied power converter according to an embodiment. FIG. 2 is a schematic block diagram of a system 101 for dynamic resonance control for a three-phase grid-tied power converter according to an embodiment. The system 101 with a three-phase grid-tied power converter is substantially similar to the system 100 of FIG. 1 except that the switching rectifier 102 and LCL filter 104 are three-phase and are connected to a three-phase voltage source $V_{src}$.

The systems 100, 101 each include a switching rectifier 102 connected to an inductor-capacitor-inductor ("LCL") filter 104 which feeds a voltage source $V_{src}$ through a source conductor 108. The switching rectifier 102 may be single-phase or three-phase. The switching rectifier 102 and LCL filter 104 form a converter 106, which is fed from a direct current ("DC") bus 110 through a conductor with line inductance $L_{line2}$. Both systems 100, 101 of FIGS. 1 and 2 each include a converter 106 with a DC input, which may be a DC bus 110. In some embodiments, the DC bus 110 is fed from a DC source 112 through a conductor with a line inductance Line. The DC source 112 may be a battery, solar panels, etc. In other embodiments, the DC bus 110 is fed from an alternating current ("AC") source 114 through an AC-to-DC converter 116. The AC source 114 may be a generator or other AC source.

In some embodiments, the switching rectifier 102 is configured to be bi-directional so that power can flow in either direction through the converter 106 formed by the switching rectifier 102 and LCL filter 104. The DC source 112 may be a battery, a solar panel system or other DC source. The AC source 114 may be a generator, a motor, a utility grid, a co-generation plant, or the like. The AC-to-DC converter 116, in some embodiments, is bi-directional. In other embodiments, the AC-to-DC converter 116 is a motor controller. One of skill in the art will recognize other ways to provide DC power to the DC bus 110.

The DC bus 110 includes a source capacitor $C_{src}$, which typically stabilizes voltage on the DC bus 110. In other embodiments, the DC bus 110 may include other elements, such as switchable resistor for controlling initial charging of the source capacitor $C_{src}$, a snubber, transient voltage surge suppression, etc. In some embodiments, the DC bus 110 does not include a capacitor and a DC source 112 or output of an AC-to-DC converter 116 or other source of DC power stabilizes the DC bus 110.

The switching rectifier 102, in some embodiments, includes switches SW1-SW4 (or SW1-SW6) configured in a full-bridge rectifier. In other embodiments, the switching rectifier 102 includes switches arranged in a half-bridge rectifier. In some embodiments, the switches SW1-SW4 (or SW1-SW6) are semiconductor switches, such as a metal-oxide-semiconductor field-effect transistor ("MOSFET"), an insulated-gate bi-polar transistor ("IGBT"), and the like. In other embodiments, the switching rectifier 102 includes a transformer and may include other elements, such as capacitors, diodes, and the like. Control of switching of the switching rectifier 102 controls the converter 106. Current or voltage feedback may be used in a feedback loop that changes switching of the converter 106. In other embodiments, the switching rectifier 102 is of another topology and provides waveforms to the LCL filter 104 that are appropriate for filtering to produce an AC waveform.

The LCL filter includes a converter inductor $L_{conv}$, a capacitor $C_{LCL}$ and a grid inductor $L_{grid}$. At the time of manufacture of the converter 106, length, size, resistance and source inductance $L_{source}$ of the source conductor 108 are unknown. The LCL filter 104 with the source inductance $L_{source}$ form a resonance that varies with the source inductance $L_{source}$. Determining parameters of a controller of the converter 106 may be difficult without knowing the source inductance $L_{source}$. Typically, once the converter 106 is installed, a technician has to tune the controller of the converter 106 by adjusting parameters to compensate for the actual location of the resonant frequency formed by the LCL filter 104 and the source inductance $L_{source}$ of the source conductor 108, which is undesirable.

In other embodiments, a control scheme that measures current in the capacitor $C_{LCL}$ may be used to compensate for the resonance formed when the converter 106 is installed. This control scheme uses a concept of a virtual resistor in series with the capacitor $C_{LCL}$. However, measuring current in the capacitor $C_{LCL}$ introduces additional failure modes and cost. Embodiments described herein include a controller for the converter 106 that uses the concept of a disturbance observer to negate effects of the variable source inductance $L_{source}$ and has an additional benefit of reducing the second order effects of the LCL filter 104 to first order effects of an inductor.

Figure 3:
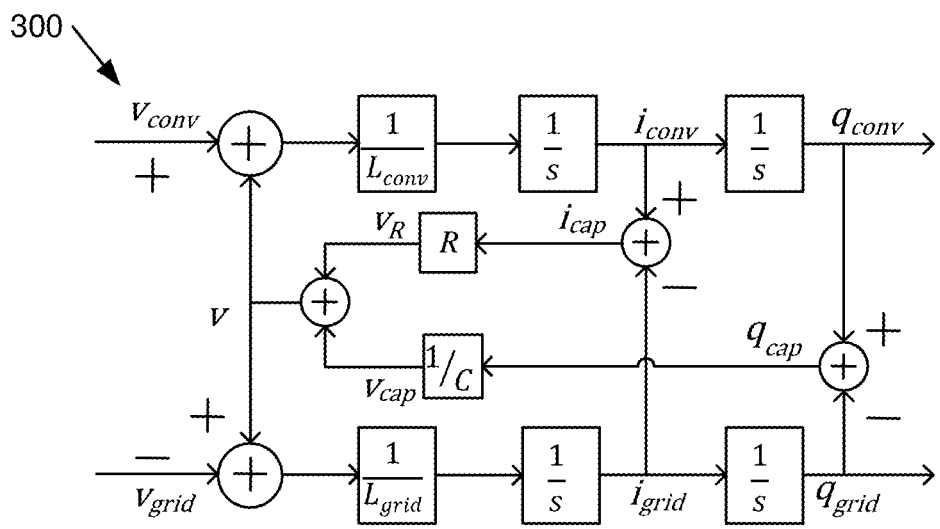
FIG. 3 is a schematic block diagram of a model of an inductor-capacitor-inductor ("LCL") filter according to an embodiment.

FIG. 3 is a schematic block diagram of a model 300 of an LCL filter. The depicted model 300 is customized for the LCL filter 104 of the converter 106 and includes a converter voltage $V_{conv}$ at the output of the switching rectifier 102, a grid voltage $V_{grid}$ at the output of the converter 106 before the source conductor 108, converter current $i_{conv}$, which is the same as current in the converter inductor $L_{conv}$, grid current $i_{grid}$, which is the current in the grid inductor $L_{grid}$, voltage at the capacitor $C_{LCL}$, the converter inductor $L_{conv}$ and the grid inductor $L_{grid}$. Note that the "q" variables are charge, which accumulates in the capacitor $C_{LCL}$ as $q_{cap}$. The resistance R, in some embodiments, is parasitic resistance. The model 300 is a well-known LaPlace model and can be used to derive equations of the LCL filter 104.

Figure 4:
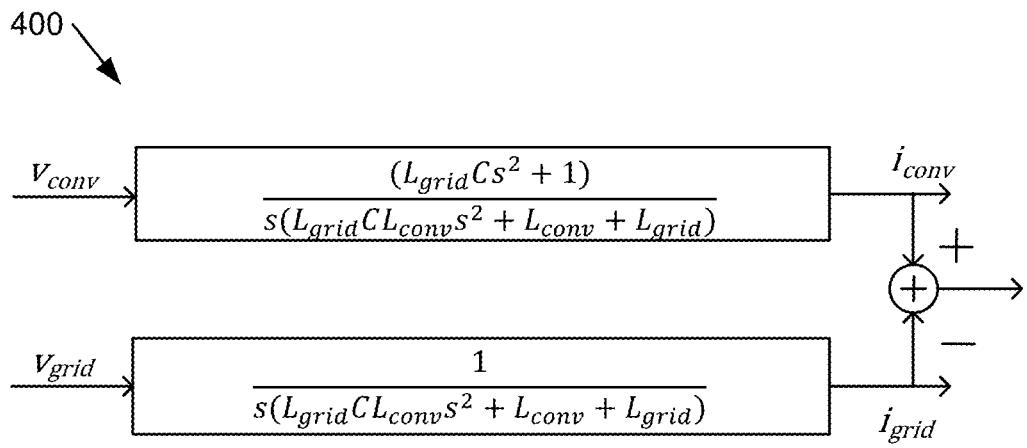
FIG. 4 is a schematic block diagram depicting equations derived from the model of FIG. 3 according to an embodiment.
Figure 5:
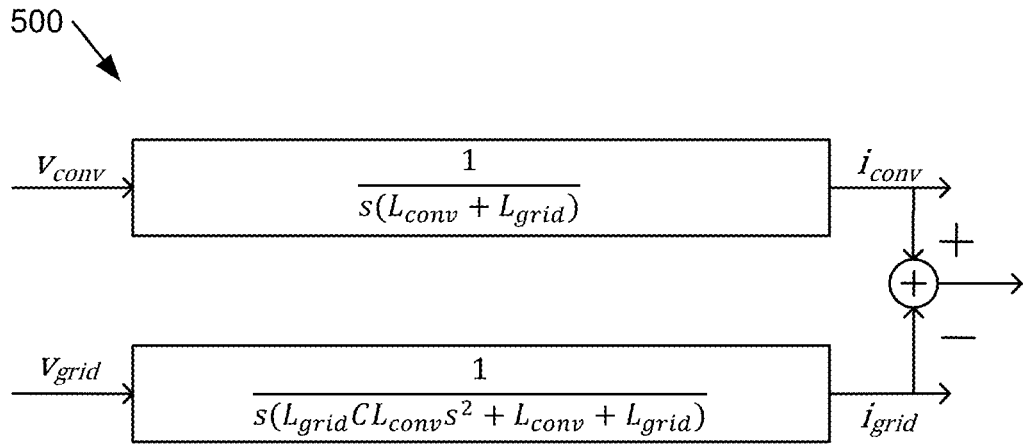
FIG. 5 is a schematic block diagram depicting simplified equations derived from FIG. 4 according to an embodiment.

FIG. 4 is a schematic block diagram 400 depicting equations derived from the model 300 of FIG. 3. Note that the upper equation has a numerator with a second order equation, which will result in a resonant frequency. Controlling a resonant frequency that moves based on length of the source conductor 106 is problematic. FIG. 5 is a schematic block diagram 500 depicting simplified equations derived from FIG. 4. The numerator of the upper equation is simplified to a first order equation based on the combined inductance of the converter inductor $L_{conv}$ and the grid inductor $L_{grid}$. A physical system (e.g. "plant") that can be represented as a first-order system is much easier to manage than a second order system. While the actual plant, which is the converter 106, source conductor 108 and voltage source $v_{src}$, is in reality a second order system, embodiments described herein use an ideal "plant" in the form of a first order equation and a disturbance observer controller to filter out unknown second order effects to simplify control design. The diagram 500 of FIG. 5 becomes the basis for an idealized "plant" where that behaves like a first order system. A disturbance observer controller is used to derive a disturbance signal that includes source inductance $L_{source}$ of the source conductor 108 and a second order effect and then cancelling out the disturbance.

Figure 6:
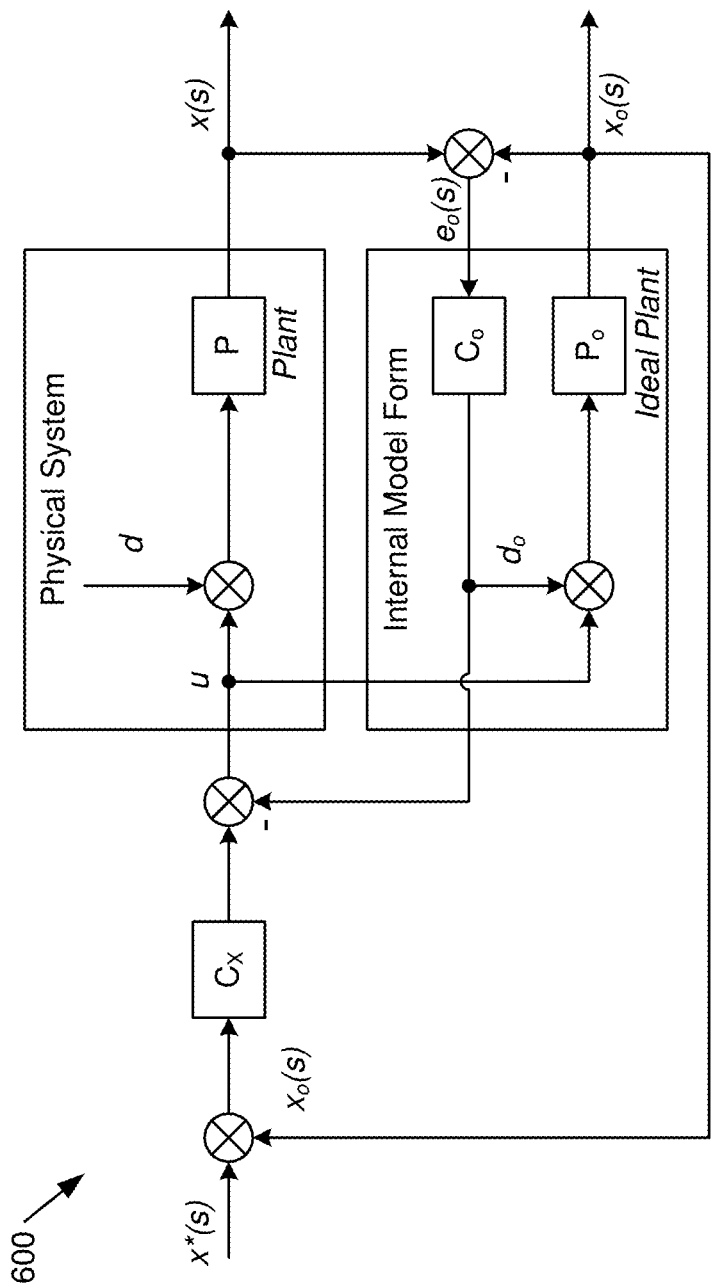
FIG. 6 is a schematic block diagram of a generic disturbance observer controller according to an embodiment.

FIG. 6 is a schematic block diagram of a generic disturbance observer controller 600. The physical system includes a plant P and a disturbance signal from an unknown source. The disturbance observer controller 600 also includes an ideal plant model $P_o$ that is simplified to reduce the plant P model and effects of the unknown disturbance to a known ideal plant model $P_o$. The disturbance observer controller 600 determines an observed disturbance $d_o$, which is fed back to cancel the actual disturbance d. If the plant P is modeled as an ideal plant $P_o$, everything different from the ideal plant model $P_o$ is treated as disturbance and rejected and the augmented system is forced to behave like the ideal plant model.

To derive the disturbance observer controller 600, the physical system is modeled with an input u summed with a disturbance d and fed to the plant P, which represents a converter and other effects of a physical plant. An ideal form includes the input u summed with a disturbance estimation $d_o$ and fed to the ideal plant model $P_o$. A second step is to subtract an estimated state output $x_o(s)$ of the ideal plant model $P_o$ from the actual state output $x(s)$ of the plant P to create an observer error signal $e_o(s)$. A third step is to at a controller, such as a proportional-integral ("PI") controller to the observer error signal $e_o(s)$, which creates the disturbance estimate signal $d_o$. A fourth step is to subtract the disturbance estimate signal $d_o$ from an output of a feedback loop controlling the physical plant P. The result is that that feedback loop sees the ideal plant model $P_o$, which includes known elements. As a result, design of the feedback loop compensator $C_x$ is designed to control the ideal plant, which is simpler to control. In addition, because unknown elements of the physical plant P are eliminated, in some embodiments the feedback compensation $C_x$ can be set when the converter is manufactured and does not need to be tuned after installation.

Figure 7:
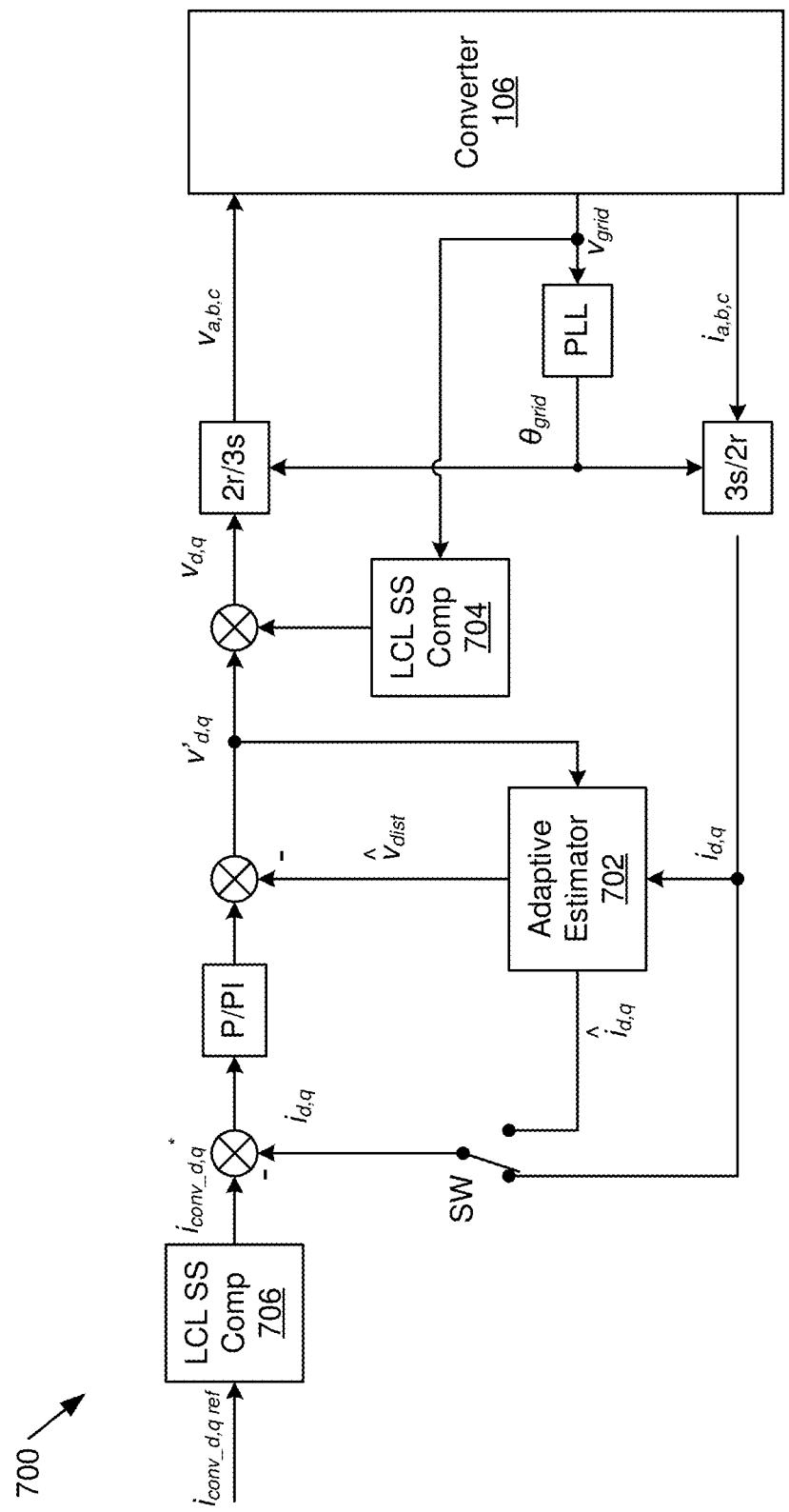
FIG. 7 is a schematic block diagram of an embodiment of a controller for a dynamic resonance control for a grid-tied power converter according to an embodiment.

FIG. 7 is a schematic block diagram of an embodiment of a controller 700 for a dynamic resonance control for a grid-tied power converter 106 according to an embodiment. In some embodiments, the controller 700 is at least partially implemented in firmware. For example, the controller 700 may include firmware and a processor with signals input from the switching rectifier 102 and/or LCL filter 104 or other locations. In other embodiments, the controller 700 is implemented with hardware circuits. In other embodiments, the controller 700 is implemented with a programmable hardware device, such as field programmable gate arrays, programmable array logic, programmable logic devices or the like.

The converter 106 includes the switching rectifier 102 and LCL filter 104. The controller 700 of FIG. 7 depicts a three-phase version with phases a, b and c. Note that signals of the controller 700 on the left are in a direct-quadrature ("d-q") domain while signals in and out of the converter 106 are in the time domain. Conversion between the d-q domain and time domain is well known to those of skill in the art. The voltage control signal $v_{d,q}$ is converted from a time domain voltage control signal $v_{a,b,c}$ through the 2r/3s block and converter current $i_{a,b,c}$ in the time domain is converted to a d-q domain converter current $i_{d,q}$ with the 3s/2r block. A grid voltage $v_{grid}$ is fed to a phase-lock loop ("PLL") block, which is used by the 2r/3s block and the 3s/2r block for conversion between the time domain and the d-q domain.

The grid voltage $v_{grid}$, in some embodiments, is a voltage at output terminals of the converter 106, as depicted in FIGS. 1 and 2. The grid voltage $v_{grid}$ may be sensed using one or more wires connected to output terminals of the converter 106 and may be conditioned and scaled as is typical in the art. For example, the grid voltage $v_{grid}$ may fed through a transformer, voltage divider, etc. and may be conditioned using a capacitor to filter noise, etc. One of skill in the art will recognize ways to sense voltage of a converter 106.

Converter current $i_{a,b,c}$ is also sensed and converted to the d-q domain and is represented as $i_{d,q}$. In the examples depicted herein, the converter current $i_{a,b,c}$ is sensed at the output of the switching rectifier 102 or through the converter inductor $L_{conv}$. Sensing may be accomplished using a current transformer, a hall-effect sensor, etc. Again, the converter current $i_{a,b,c}$ is conditioned for use by the controller 700, for example using a filter, a snubber, a voltage divider, etc.

An adaptive estimator 702 of the controller 700 is similar to the Internal Model Form block of the disturbance observer controller 600 of FIG. 6. The adaptive estimator 702 includes at least an ideal model of the LCL filter 104 and may include effects of the switching rectifier 102. The adaptive estimator 702 has inputs of a preliminary voltage control signal $v'_{d,q}$, which aligns with the input u except for steady-state effects of the LCL filter 104, and the converter current $i_{d,q}$, which aligns with the actual state output x(s) of the plant P for the disturbance observer controller 600. The adaptive estimator 702 has an output of a disturbance voltage $\hat{v}_{dist}$ that roughly aligns with the disturbance estimation $d_o$ of the disturbance observer controller 600. The disturbance voltage $\hat{v}_{dist}$ compensates for any dynamic differences from the ideal model embodied in the adaptive estimator 702. The disturbance voltage $\hat{v}_{dist}$ (disturbance estimate) includes any dynamic differences between the ideal model and the actual system, including unknown source inductances, nonlinearities, time variance, external disturbances, parameter perturbations, and slow degradation with age. When compensating for this disturbance in real time, the system 100, 101 is forced to behave with the desired dynamics of the ideal model. The disturbance voltage $\hat{v}_{dist}$ is subtracted from an output of feedback loop of the converter 106 to form the preliminary voltage control signal $v'_{d,q}$.

The feedback controller within the converter 106 (not shown) may be proportional or proportional-integral control (represented by the P/PI block). The P/PI control is compensated using an adaptive estimator based on an ideal model of the LCL filter 104 and on an ideal model of the switching rectifier 102, which is much simpler than compensation based on the actual LCL filter 104 and actual switching rectifier 102 with the unknown source inductance $L_{source}$ of the source conductor 108. The feedback loop of the converter 106 includes a reference signal $i_{conv\_d,q\_ref}$ that is fed into a second LCL SS comp block 706.

The adaptive estimator 702 generates a desired dynamic behavior of the converter 106 using a simple filter to represent the LCL filter 104. The adaptive estimator 702, in some embodiments, includes a model of a simple filter to generate a desired dynamic behavior of LCL filter 104. In some embodiments, the adaptive estimator 702 generates an ideal dynamic behavior. The simple filter, in some embodiments, is a lower order model than the actual plant, which is the converter 106 with an LCL filter 104, the conductor 108, grid voltage source $V_{src}$, etc. In other embodiments, the simple filter is a first order filter model of the LCL filter 104. In other embodiments, the simple filter is a model of an inductor that includes inductance of the converter inductor $L_{conv}$ and grid inductor $L_{grid}$. In some embodiments, the simple filter includes effects of the switching rectifier 102 in addition to the LCL filter 104.

In some embodiments, converter current $i_{d,q}$ is subtracted from the output $i_{conv\_d,q}*$ of the second LCL SS comp block 706 and a resulting signal is fed to the P/PI control. In other embodiments, output of the ideal LCL filter model of the adaptive estimator 702 generates an idealized output current of the converter 106 and is subtracted from the output $i_{conv\_d,q}*$ of the second LCL SS comp block 706 and a resulting signal is fed to the P/PI control. Simulation results indicate that using the output of the ideal LCL filter model as input to the feedback loop of the converter 106 provides control of the converter similar to using output current of the converter 106. A selector switch SW is depicted to point out the two options for input to the feedback loop of the converter 106. The selector switch SW is not included where a designer picks one option or the other.

The preliminary voltage control signal $v'_{d,q}$ is summed with output $V_{grid\_d,q}$ of an LCL steady-state ("SS") comp block 704 to form a voltage control signal $v_{d,g}$, which controls switching of the switching rectifier 102. The preliminary voltage control signal $v'_{d,q}$ is also input to the adaptive estimator 702, as explained in more detail for the controller 800 of FIG. 8. The LCL SS comp block 704 compensates for the steady-state effects of the LCL filter 104 due to a voltage difference between an output voltage of the converter 106 and an output voltage of the switching rectifier 102. The LCL SS comp block 704 has a function that typically includes an input of the grid voltage $v_{grid}$, which is the output voltage of the converter 106, and the converter current $i_{d,q}$ (inputs to the LCL SS comp 704 not shown).

Beneficially, the adaptive estimator 702 negates the unknown source inductance $L_{source}$ and reduces the LCL filter 104 to a first-order model using a disturbance observer model specific to the converter 106. Compensation (e.g. P/PI) for the feedback loop of the converter 106 is easier to derive because the P/PI block sees an ideal switching rectifier 102 and LCL filter 104 with a single inductor (converter inductance $L_{conv}$ plus grid inductance $L_{grid}$), which are both known values.

Figure 8:
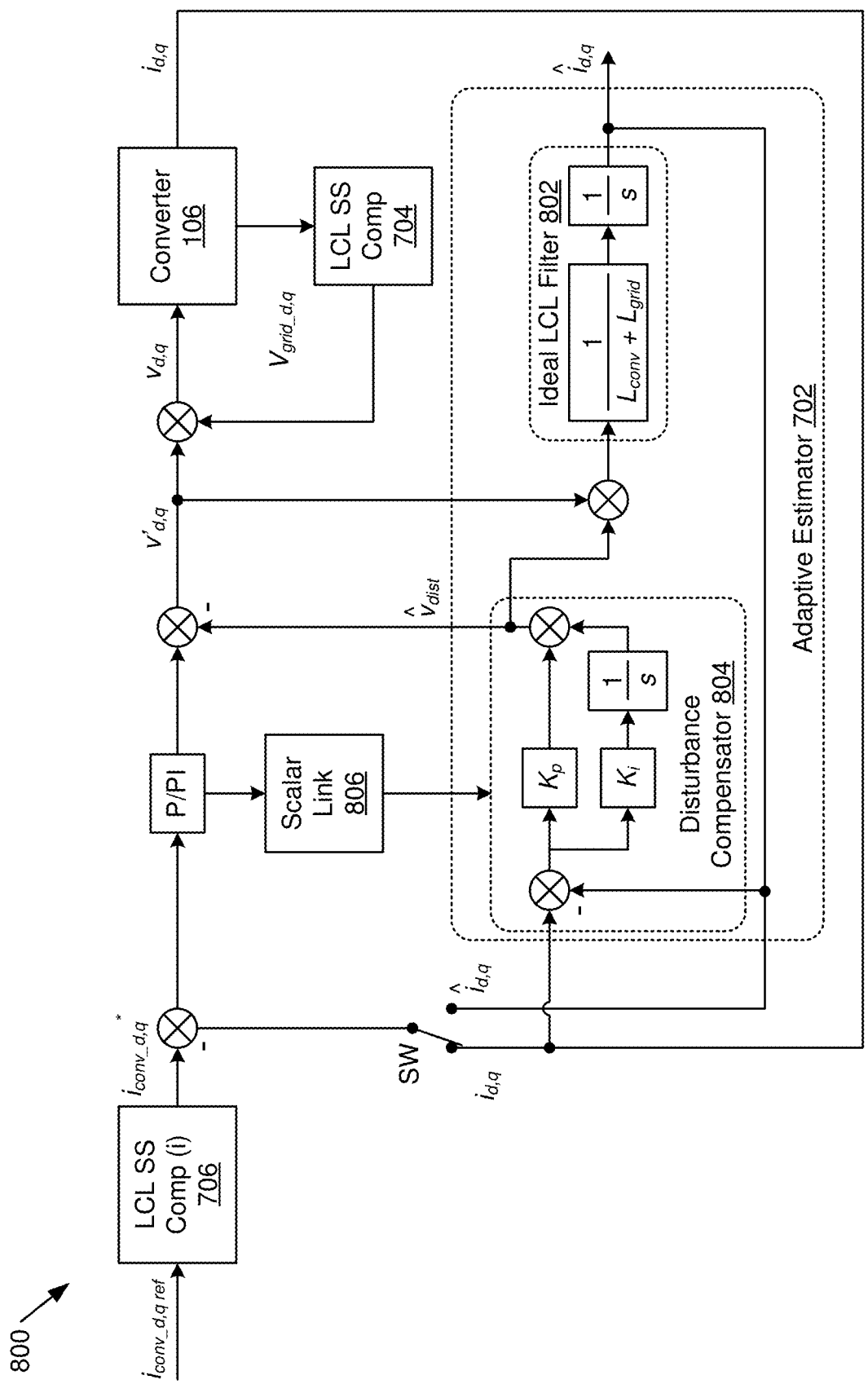
FIG. 8 is a schematic block diagram of another more detailed embodiment of a controller for a dynamic resonance control for a grid-tied power converter according to an embodiment.

FIG. 8 is a schematic block diagram of another more detailed embodiment of a controller 800 for a dynamic resonance control for a grid-tied power converter 106 according to an embodiment. The controller 800 may be implemented in firmware, hardware circuits, a programmable hardware device or a combination thereof and may be implemented in a similar way as the controller 700 of FIG. 7. The controller 800 is a more detailed version of the controller 700 of FIG. 7 but is depicted in the d-q domain. The adaptive estimator 702 includes an ideal LCL filter model 802 that includes the converter inductance $L_{conv}$ plus grid inductance $L_{grid}$, as depicted in the numerator of the upper block of the equations of FIG. 5. Other effects of the switching rectifier 102 are included in some embodiments.

The adaptive estimator 702 includes a disturbance compensator 804. In some embodiments, the disturbance compensator 804 is a proportional-integral control, as depicted, with compensation values $K_i$ and $K_p$. In other embodiments, the disturbance compensator 804 includes proportional control. In other embodiments, the disturbance compensator 804 includes proportional-integral-derivative control. Output of the disturbance compensator 804, which is the disturbance voltage $\hat{v}_{dist}$, is subtracted from the output of the feedback loop of the converter 106, as in the controller 700 of FIG. 7. The disturbance voltage $\hat{v}_{dist}$ is also summed with the preliminary voltage control signal $v'_{d,q}$ and is input to the ideal LCL filter model 802, which matches with the disturbance estimate $d_o$ summed with the input u and input to the ideal plant $P_o$ of the disturbance observer controller 600 of FIG. 6.

In some embodiments, the compensation values $K_i$ and $K_p$ of the disturbance compensator 804 are related to compensation terms in the feedback loop of the converter 106. For example, the compensation values $K_i$ and $K_p$ of the disturbance compensator 804 may be scaled by similar terms of a PI controller of the feedback loop of the converter 106 by using a scalar link 806 that makes changes to the compensation values $K_i$ and $K_p$ of the disturbance compensator 804 when changes to similar $K_i$ and $K_p$ terms of the controller of the feedback loop of the converter 106 are made. The scalar link 806, in one embodiment, changes a proportional compensation value $K_p$ of the disturbance compensator 804 by a scalar value of a proportional compensation value $K_p$ of the feedback loop of the converter and/or changes an integral compensation value $K_i$ of the disturbance compensator 804 by a scalar value of an integral compensation value $K_i$ of the feedback loop of the converter 106.

In other embodiments, the scalar link 806 scales the $K_i$ and $K_p$ terms of the disturbance compensator 804 using a more complex formula, such as a formula with an offset added to a product of a multiplier and a compensation value of the controller of the converter feedback loop. In other embodiments where the controller of the feedback loop of the converter 106 includes proportional control, the scalar link 806 sets the compensation values $K_i$ and $K_p$ of the disturbance compensator 804 in relation to a single $K_p$ term of the controller of the converter feedback loop.

Using a disturbance observer controller for the converter 106 reduces complexity of controls for the converter 106 so that, in some embodiments, compensation values of the disturbance compensator 804 are related to compensation values of the converter feedback loop. In the embodiment, when compensation values of the controller of the converter feedback loop are adjusted, the scalar link 806 automatically adjusts the compensation values $K_i$ and $K_p$ of the disturbance compensator 804 so that an end user does not have to make adjustments to the compensation values $K_i$ and $K_p$ of the disturbance compensator 804. This scalar link 806 reduces complexity of tuning of the controller 800 of the converter 106.

Figure 9:
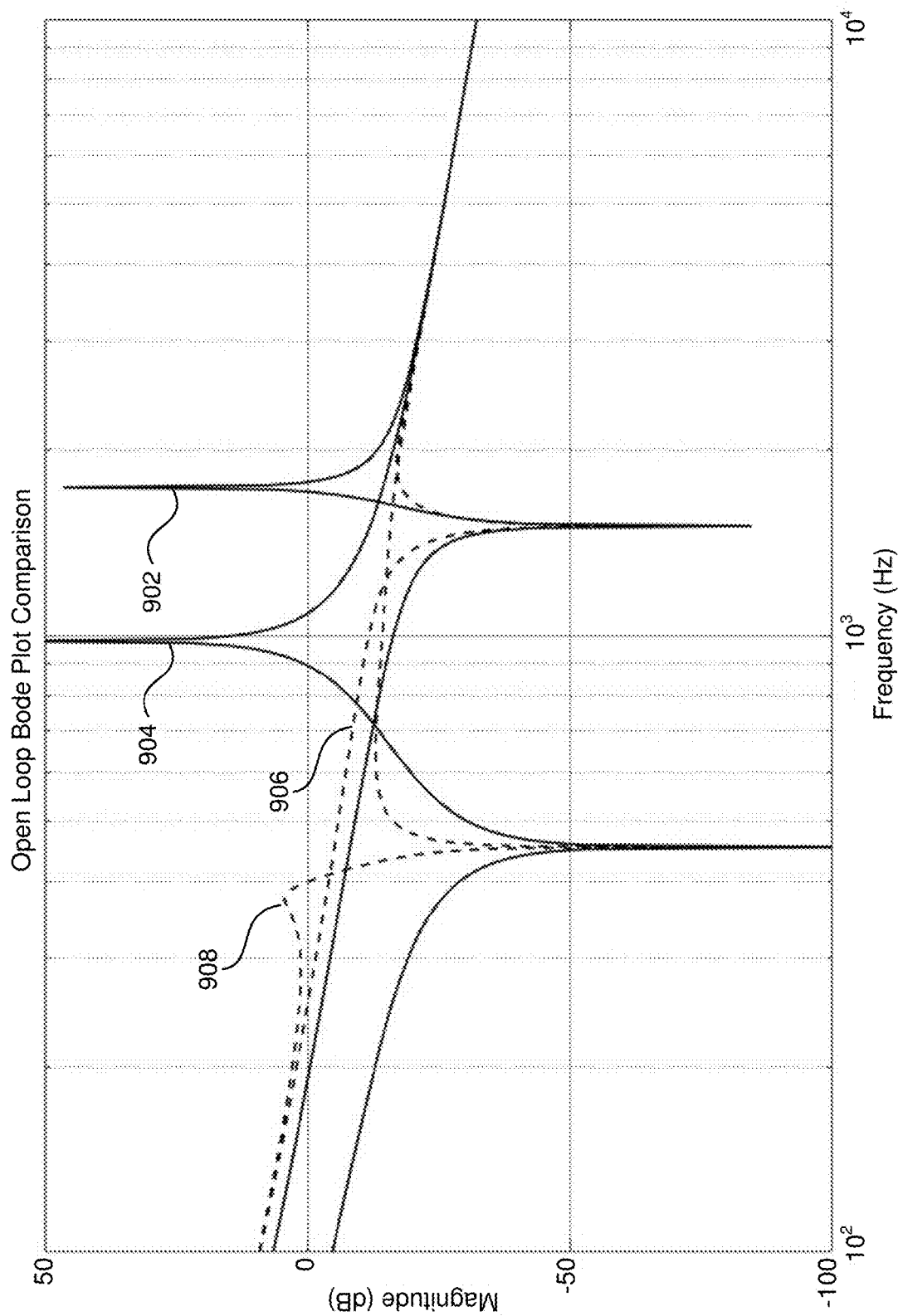
FIG. 9 depicts simulation results of dynamic resonance control for a grid-tied power converter with an LCL filter for different source inductance values with open loop and closed loop results.

FIG. 9 depicts simulation results of dynamic resonance control for a grid-tied power converter with an LCL filter for different source inductance values with open loop and closed loop results. The simulation results are an open loop forward bode plot from current command to current output. The simulation results each include a same LCL filter 104 with changes to the source inductance $L_{source}$. A first trace 902 is for no source inductance $L_{source}$ and without the adaptive estimator 702. Note that there is a resonance at around 1500 hertz ("Hz"). A second trace 904 is for a source inductor $L_{source}$ of ten times the inductance of the grid inductor $L_{grid}$ and has a resonance at around 1000 Hz. The variation in the resonant frequency for various source inductances $L_{source}$ due to varying lengths and types of the source conductor 108 make compensation difficult and often requires tuning of the converter 106 after installation.

A third trace 906 is for no source inductance $L_{source}$ but with the adaptive estimator 702. Note that no sizable resonance occurs in the third trace 906. A fourth trace 908 is for a source inductor $L_{source}$ with an inductance of ten times the inductance of the grid inductor $L_{grid}$ and with the adaptive estimator 702. Again, no resonance occurs in the fourth trace 908. The simulation results contribute to validation of the idea that an adaptive estimator 702 improves manageability of a converter 106 with a switching rectifier 102 and an LCL filter 104. Note that the adaptive estimator 702 does not require measurement of current of the capacitor $C_{LCL}$ of the LCL filter 104, which is advantageous to increase reliability. Having a sensor and related hardware to measure capacitor current increases chances of failure.

Figure 10:
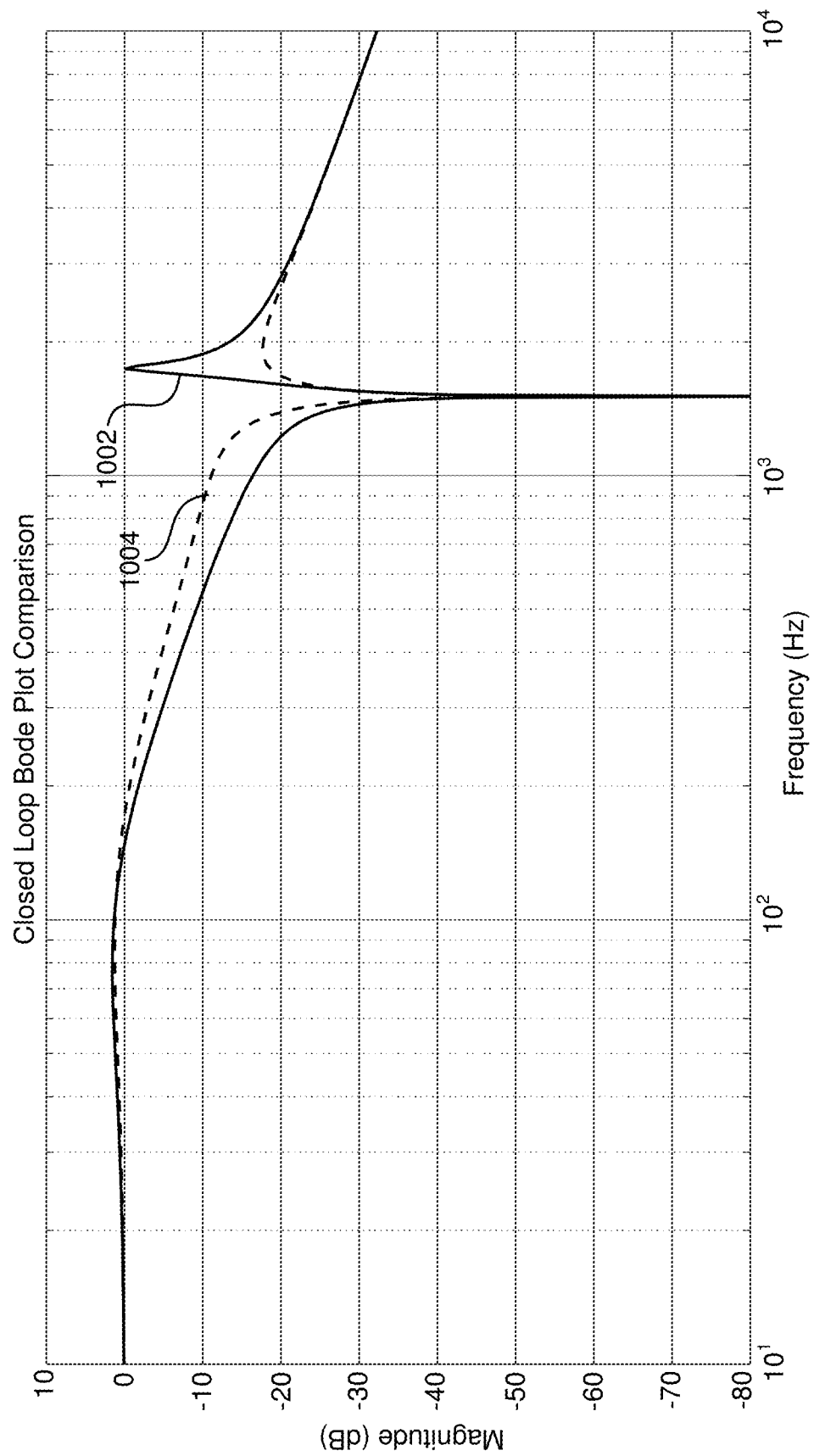
FIG. 10 depicts closed loop simulation results of a dynamic resonance control for a grid-tied power converter with and LCL filter.

FIG. 10 depicts closed loop simulation results of a dynamic resonance control for a grid-tied power converter 106 with and LCL filter 104. The simulation results include a bode plot depicting closed loop results. The solid line 1002 is for a conventional proportional-integral control. Notice that a resonant peak occurs at around 1800 Hz. The dashed line 1004 includes closed loop results for a converter with an LCL filter where the feedback loop includes proportional-integral control and also includes the adaptive estimator 702. Notice that the resonant peak is gone, which allows for much simpler controls.

Figure 11:
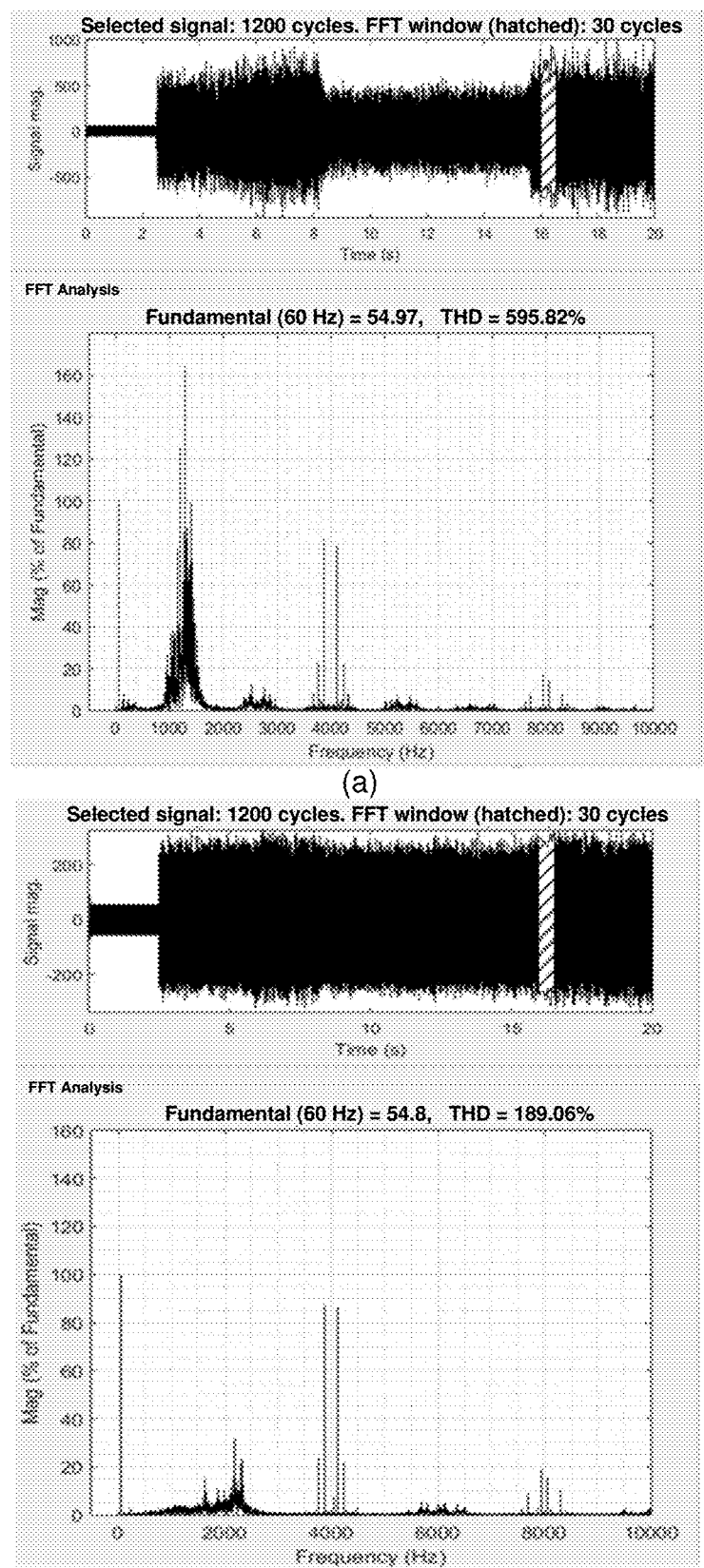
FIG. 11 depicts simulation results and a Fast-Fourier transform for a converter with an LCL filter without compensation and with an embodiment of disturbance observer control depicted in FIGS. 7 and 8.

FIG. 11 depicts simulation results and a Fast-Fourier transform for a converter 106 with an LCL filter 104 without compensation (upper plot (a)) and with an embodiment of a disturbance observer controller 700, 800 depicted in FIGS. 7 and 8 (lower plot (b)). The upper plot (a) depicts time-based capacitor $C_{LCL}$ current waveforms for 1200 cycles on top and a Fast-Fourier transform ("FFT") analysis below for 30 cycles where the upper plot (a) is simulated without the adaptive estimator 702. Note that the magnitude of the capacitor $C_{LCL}$ current waveform is over 500 amperes, which may damage the capacitor $C_{LCL}$. The FFT analysis is based on 30 cycles shown in the upper waveform as hatched. The FFT analysis depicts a significant resonance point at around 1200 Hz with a total harmonic distortion of 578.96%. The results indicate that compensation that does not include the adaptive estimator 702 or other means to dampen the resonance is unacceptable.

The lower plot (b) depicts time-based capacitor $C_{LCL}$ current waveforms for 1200 cycles on top and a Fast-Fourier transform ("FFT") analysis below for 30 cycles where the lower plot (b) is simulated with the adaptive estimator 702. Note that the magnitude of current in the capacitor $C_{LCL}$ is around 220 A, which indicates a significant reduction of current in the capacitor $C_{LCL}$. The FFT analysis in the lower plot (b) shows no significant resonance at 1200 Hz. Note that the resonances depicted at around 4000 Hz are related to a switching frequency of the switching rectifier 102. The lower plot (b) indicates a significant improvement in control of current in the capacitor $C_{LCL}$ using a method that does not include measurement of current in the capacitor $C_{LCL}$.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component comprising:
    an adaptive estimator for a converter, the adaptive estimator comprising a voltage input and a current input, the converter comprising a switching rectifier connected to an inductor-capacitor-inductor ("LCL") filter comprising, for each phase of the converter, a converter inductor connected to the switching rectifier, a capacitor, and a grid inductor connected to a voltage source through a source conductor with an unknown inductance, the current input from at least one converter inductor of a phase of the converter, the adaptive estimator comprising an ideal LCL filter model and a disturbance compensator, the ideal LCL filter model configured to generate, using a simple filter, a desired dynamic behavior of the converter and LCL filter; and
    an LCL steady-state ("SS") compensation configured to model a steady-state effect of the LCL filter and source conductor,
    wherein an output of the adaptive estimator is subtracted from an output of a feedback loop of the converter to form a preliminary voltage control signal,
    wherein the preliminary voltage control signal is summed with an output of the LCL SS compensation to form a voltage control signal configured to control switching of the switching rectifier, and wherein the preliminary voltage control signal is the voltage input to the adaptive estimator.

2. The component of claim 1, wherein the LCL filter model is configured to generate the desired dynamic behavior of the converter and LCL filter with a model of an inductor comprising inductance of the converter inductor and the grid inductor without inductance of the source conductor.

3. The component of claim 2, wherein the LCL filter model is further configured to generate the desired dynamic behavior of the converter and LCL filter with a model comprising effects of the switching rectifier.

4. The component of claim 1, wherein the disturbance compensator comprises at least proportional control.

5. The component of claim 1, wherein an output of the ideal LCL filter model is subtracted from current in a converter inductor of at least one phase of the converter to form an input to the disturbance compensator, wherein output of the disturbance compensator comprises a disturbance estimate and wherein the disturbance estimate is summed with the preliminary voltage control signal and a resultant signal comprises input to the ideal LCL filter model.

6. The component of claim 1, wherein compensation values of the disturbance compensator are related to compensation values of the feedback loop of the converter.

7. The component of claim 6, further comprising a scalar link that changes a proportional compensation value of the disturbance compensator by a scalar value of a proportional compensation value of the feedback loop of the converter and/or changes an integral compensation value of the disturbance compensator by a scalar value of an integral compensation value of the feedback loop of the converter.

8. The component of claim 1, wherein compensation values of the feedback loop of the converter are derived based on the ideal LCL filter model.

9. The component of claim 1, wherein output of the ideal LCL model is subtracted from a current reference signal to form an input to feedback compensation of the feedback loop of the converter.

10. The component of claim 1, wherein an input to the switching rectifier is a direct current ("DC") source and the converter and LCL filter generate alternating current ("AC") current and voltage.

11. The component of claim 1, wherein the switching rectifier is a full bridge rectifier comprising integrated circuit switches and wherein the converter is bidirectional.

12. The component of claim 1, wherein the converter is single phase or three phase and each phase of the converter comprises an LCL filter where the converter is a three phase converter.

13. A method comprising:
subtracting an output of an adaptive estimator from an output of a feedback loop of a converter to form a preliminary voltage control signal, the converter comprising a switching rectifier and an inductor-capacitor-inductor ("LCL") filter comprising, for each phase of the converter, a converter inductor connected to the switching rectifier, a capacitor, and a grid inductor connected to a voltage source through a source conductor with an unknown inductance, the adaptive estimator comprising an ideal LCL filter model and a disturbance compensator, the ideal LCL filter model generates, using a simple filter, a desired dynamic behavior of the converter and LCL filter;
inputting output current of the converter to the adaptive estimator, the output current of the converter based on current of at least one converter inductor; and
summing the preliminary voltage control signal with output of an LCL steady-state ("SS") compensation to form a voltage control signal, the voltage control signal controlling switching of the switching rectifier, the LCL SS compensation modeling a steady-state effect of the LCL filter and source conductor, the preliminary voltage control signal comprising a voltage input to the adaptive estimator.

14. The method of claim 13, wherein the LCL filter model is configured to generate the desired dynamic behavior of the converter and LCL filter with a model of an inductor comprising inductance of the converter inductor and the grid inductor without inductance of the source conductor.

15. The method of claim 13, further comprising subtracting output of the ideal LCL model from a current reference signal and inputting a resultant signal to feedback compensation of the feedback loop of the converter.

16. The method of claim 13, wherein the disturbance compensator comprises at least proportional control.

17. The method of claim 13, further comprising subtracting an output of the ideal LCL filter model from current in a converter inductor of at least one phase of the converter to form an input to the disturbance compensator, wherein an output of the disturbance compensator comprises a disturbance estimate and further comprising summing the disturbance estimate with the preliminary voltage control signal and inputting a resultant signal to the ideal LCL filter model.

18. The method of claim 13, further comprising setting a proportional compensation value of the disturbance compensator to be a scalar value of a proportional compensation value of the feedback loop of the converter and/or setting an integral compensation value of the disturbance compensator to be a scalar value of an integral compensation value of the feedback loop of the converter.

19. The method of claim 13, wherein an input to the switching rectifier is a direct current ("DC") source and the converter and LCL filter generate alternating current ("AC") current and voltage, wherein the switching rectifier is a full bridge rectifier comprising integrated circuit switches and wherein the converter is bidirectional.

20. A system comprising:
a converter comprising a switching rectifier and an inductor-capacitor-inductor ("LCL") filter comprising, for each phase of the converter, a converter inductor connected to the switching rectifier, a capacitor, and a grid inductor connected to a voltage source through a source conductor with an unknown inductance; and
a controller comprising:
an adaptive estimator comprising a voltage input and a current input, the current input from at least one converter inductor of a phase of the converter, the adaptive estimator comprising an ideal LCL filter model and a disturbance compensator, the ideal LCL filter model configured to generate, using a simple filter, a desired dynamic behavior of the converter and LCL filter; and
an LCL steady-state ("SS") compensation configured to model a steady-state effect of the LCL filter and source conductor,
wherein an output of the adaptive estimator is subtracted from an output of a feedback loop of the converter to form a preliminary voltage control signal, wherein the preliminary voltage control signal is summed with an output of the LCL SS compensation to form a voltage control signal configured to control switching of the switching rectifier, and wherein the preliminary voltage control signal is the voltage input to the adaptive estimator.

* * * * *